United States Patent
Nisser et al.

(10) Patent No.: US 12,515,099 B2
(45) Date of Patent: Jan. 6, 2026

(54) MEASURING SYSTEM FOR MEASURING THE HAND/EYE REACTION ABILITY

(71) Applicant: SANIVA DIAGNOSTICS GMBH, Erfurt (DE)

(72) Inventors: Jenny Nisser, Erfurt (DE); Sven Rupprecht, Jena (DE); Steffen Derlien, Jena (DE)

(73) Assignee: SANIVA DIAGNOSTICS GMBH, Erfurt (DE)

( * ) Notice: Subject to any disclaimer, the term of this patent is extended or adjusted under 35 U.S.C. 154(b) by 754 days.

(21) Appl. No.: 17/753,234

(22) PCT Filed: Aug. 19, 2020

(86) PCT No.: PCT/EP2020/073193
§ 371 (c)(1),
(2) Date: Feb. 24, 2022

(87) PCT Pub. No.: WO2021/037631
PCT Pub. Date: Mar. 4, 2021

(65) Prior Publication Data
US 2022/0288458 A1    Sep. 15, 2022

(30) Foreign Application Priority Data

Aug. 26, 2019   (EP) .................................. 19193520
Jun. 15, 2020   (DE) ..................... 10 2020 115 749.5

(51) Int. Cl.
*A63B 24/00*   (2006.01)
*A61B 5/11*    (2006.01)
(Continued)

(52) U.S. Cl.
CPC ........ *A63B 24/0062* (2013.01); *A61B 5/1124* (2013.01); *A61B 5/162* (2013.01); *A61B 5/225* (2013.01); *A63B 2220/00* (2013.01)

(58) Field of Classification Search
CPC ............ A63B 24/0062; A63B 2220/00; A61B 5/1124; A61B 5/225; A61B 5/162; A61B 5/0002; A61B 2503/08; A61B 2505/09
See application file for complete search history.

(56) References Cited

U.S. PATENT DOCUMENTS

| | | | | |
|---|---|---|---|---|
| 3,334,424 A | * | 8/1967 | Pond ...................... | A61B 5/162 |
| | | | | 273/446 |
| 3,717,347 A | * | 2/1973 | Hottendorf .............. | A61B 5/18 |
| | | | | 434/258 |

(Continued)

FOREIGN PATENT DOCUMENTS

| | | |
|---|---|---|
| CN | 108778121 A | 11/2018 |
| JP | S55-43019 U | 3/1980 |

(Continued)

OTHER PUBLICATIONS

TW201105294A Measuring device of drop stick reaction time. Description English machine translation. Obtained from Espacenet. Accessed Jun. 13, 2025. <URL: https://worldwide.espacenet.com/patent/search/family/044813974/publication/TW201105294A?q=TW201105294> (Year: 2009).*

(Continued)

*Primary Examiner* — Carl V Larsen
(74) *Attorney, Agent, or Firm* — Heslin Rothenberg Farley & Mesiti P.C.

(57) ABSTRACT

The invention relates to a measuring system for reproducibly measuring reaction time curves in the case of a complex neurocognitive task. For this purpose, human influences are largely prevented when carrying out the experiment. As a result of external data processing, the measuring system is able to form an independently growing and anonymous data basis which increases in accuracy due to the continuously increasing amount of data therein. This also allows state- (Continued)

ments to be made about potentially dangerous changes in reaction times up to the indication and/or identification of neurodegenerative diseases.

19 Claims, 6 Drawing Sheets

(51) Int. Cl.
  *A61B 5/16* (2006.01)
  *A61B 5/22* (2006.01)

(56) References Cited

U.S. PATENT DOCUMENTS

| | | | | |
|---|---|---|---|---|
| 3,747,589 | A * | 7/1973 | Harrison | A61B 5/162 |
| | | | | 600/559 |
| 4,534,557 | A * | 8/1985 | Bigelow | A63B 69/32 |
| | | | | 482/84 |
| 5,407,212 | A * | 4/1995 | Dobson | A63F 9/0096 |
| | | | | 273/446 |
| 5,439,217 | A * | 8/1995 | Ganger, Sr. | A63B 69/3635 |
| | | | | 473/202 |
| 6,002,336 | A * | 12/1999 | Widding | A63B 71/0605 |
| | | | | 482/8 |
| 6,416,485 | B1 | 7/2002 | Rovetta et al. | |
| 6,517,480 | B1 * | 2/2003 | Krass | A61B 5/225 |
| | | | | 600/595 |
| 8,657,295 | B2 * | 2/2014 | Ashton-Miller | A61B 5/1125 |
| | | | | 600/587 |
| 8,690,325 | B1 * | 4/2014 | Straus | A61B 5/0002 |
| | | | | 351/200 |
| 10,045,730 | B2 * | 8/2018 | Fine | A61B 5/1124 |
| 2005/0148893 | A1 * | 7/2005 | Misczynski | A61B 5/4812 |
| | | | | 600/513 |
| 2005/0187436 | A1 * | 8/2005 | Doniger | A61B 5/16 |
| | | | | 128/920 |
| 2006/0195018 | A1 * | 8/2006 | Guillen | A61B 5/16 |
| | | | | 600/300 |
| 2009/0025475 | A1 * | 1/2009 | DeBeliso | A61B 5/225 |
| | | | | 73/379.02 |
| 2010/0324443 | A1 * | 12/2010 | Ashton-Miller | A61B 5/1125 |
| | | | | 600/554 |
| 2014/0163426 | A1 * | 6/2014 | Alberts | A61B 5/1124 |
| | | | | 600/595 |
| 2015/0245789 | A1 * | 9/2015 | Dromerick | A61B 5/1124 |
| | | | | 600/558 |
| 2017/0055885 | A1 * | 3/2017 | Shoeb | A61B 5/7264 |
| 2017/0069223 | A1 * | 3/2017 | Cramer | A63F 13/218 |
| 2017/0332969 | A1 * | 11/2017 | Martin | A61M 5/20 |
| 2018/0126219 | A1 * | 5/2018 | Parvaneh | G16H 40/63 |
| 2019/0159714 | A1 * | 5/2019 | Nagasu | A63B 24/0062 |
| 2019/0343428 | A1 * | 11/2019 | De Vries | A61B 5/6891 |

FOREIGN PATENT DOCUMENTS

| | | |
|---|---|---|
| JP | 2018126449 A | 8/2018 |
| TW | 201105294 A | 2/2011 |

OTHER PUBLICATIONS

International Search Report (and English translation) and Written Opinion of the International Searching Authority for International Application No. PCT/EP2020/073193 mailed on Oct. 12, 2020.

Eckner et al., "Effect of Concussion on Clinically Measured Reaction Time of 9 NCAA Division I Collegiate Athletes: A Preliminary Study" The American Academy of Physical Medicine and Rehabilitation, vol. 3, 212-218, Dec. 2010.

* cited by examiner

MEASURING SYSTEM FOR MEASURING THE HAND/EYE REACTION ABILITY

CROSS REFERENCE TO RELATED APPLICATIONS

This application is a national stage filing under section 371 of International Application No. PCT/EP2020/073193 filed on Aug. 19, 2020, and published on Mar. 4, 2021 as WO 2021/037631 A1, which claims priority to European Application No. 19193520.4, filed on Aug. 26, 2019 and German Application No. 10 2020 115 749.5, filed on Jun. 15, 2020. The entire contents of WO 2021/037631 are hereby incorporated herein by reference.

The invention relates to a measuring system which is suitable for measuring the human hand-eye reaction ability when performing a complex neurocognitive movement task.

Complex neurocognitive movement tasks are primarily influenced by individual hand-eye reaction ability, attention and gripping function.

The minimal example of a test setup for detecting the hand-eye reaction ability, attention and gripping function of a test subject is the drop rod test.

In the simplest case, a rod of suitable length, often approx. 50 cm to 100 cm, is held vertically in one hand by an examiner. In this case, the held rod is located above or loosely in the hand of a test subject that is to be measured. The examiner lets go of the rod. This rod accelerates due to the gravitational effect of the earth and is caught by the test subject after a short time. The distance traveled by the rod allows conclusions to be drawn about the reaction time of the test subject from the physical laws of free fall. This solution has various limitations which can influence the test subject's reaction performance. The minimal example has a slight objectivity in the test setup described.

Some solutions for increasing the reproducibility of the results of the drop rod test by means of technology are known from the prior art.

TW 2011052894 A1 discloses a drop rod test in which a stopwatch is integrated. Before the measurement, the rod is connected to the holding device thereof in such a way that it hangs vertically. The holding device is, for example, an electromagnet. The start of a measurement is determined by an examiner who opens the holding device—in the case of the electromagnet, interrupts the power supply by pressing a button. The stopwatch inside the rod is started and the rod is accelerated by the earth's gravitational field. A second switch is located on the outside of the rod. If the rod is caught, the stopwatch is stopped and the measured time difference is shown directly on a display on the rod.

US 2010/0324443 A1 discloses a compact device for measuring a wide range of types of reaction ability. For example, the device gives the test subject an instruction—to press a certain button on the device—by means of an optical stimulus implemented by different colored LEDs, or an acoustic stimulus. The period of time that the test subject requires to carry out the action is measured. Depending on the type and use of the stimulus, different reaction times can be recorded. In addition to the simple reaction time, a decision or selection component can also be incorporated into the movement task. The device also has an accelerometer. This detects changes in acceleration and thus implements a the stopwatch. The device has a simple display which outputs the information about the time difference measured in each case.

JP 55-43019 discloses an electromagnetically held drop rod, in which the triggering— the starting of the clock—is indicated by certain stimuli. For example, the test subject's eyes are closed and an acoustic signal is selected by the examiner. If this signal is the triggering signal, the reaction time of the movement task to be performed to a purely acoustic stimulus can be measured with the optical analyzer switched off. Similarly, various lamps are attached to the measuring setup. The examiner lights up the lamps. If the lamp with the triggering signal is displayed, the test subject has to react and the hand-eye reaction time is measured.

In the prior art, only measuring systems which derive physiological statements regarding the reaction times of the test subject exclusively from two measured points in time are proposed. None of the technical solutions mentioned are able to perform measurement tasks which go beyond the capabilities of a randomly started stopwatch.

The problem addressed by the invention is that of proposing a measuring system in which a necessarily dense point cloud of measurement data is recorded, which log the curve of the force exerted by the test subject on the measuring system and the acceleration behavior of the instrument during catching and shortly after catching, processing the data obtained in this way, and subjecting it to a comparison with limit values and/or data from a normative database.

The problem is solved by the features of the main claim and the features of the additional independent claims. Preferred designs are the subject of the dependent claims, which refer back in each case.

The measuring system in this case comprises at least one measuring body for measuring hand-eye reaction ability in a complex neurocognitive movement task. Said measuring body is accelerated out of the at least one holding device thereof by means of at least one force source. In this case, a first sensor unit, which is designed to measure acceleration, detects the acceleration curve over time. In addition to measuring the acceleration curve, a further sensor measured variable is detected by means of an at least second sensor unit.

The sensor data obtained in this way can be transmitted as computer-readable signals to a data processing unit by means of at least one interface for data transmission.

The data processing unit processes the transmitted sensor data.

A method for quantifying reaction times and the gripping function is used to provide comparable data. This method comprises the following steps:
 a) providing a measuring system for measuring hand-eye reaction ability and gripping function,
 b) positioning a test subject relative to the measuring system,
 c) starting the measurement,
 d) randomly triggering the force effect,
 e) detecting the acceleration curve over the measurement duration,
 f) detecting all additional sensor information,
 g) transferring all sensor data to the data processing unit,
  a. logging the determined data,
  b. storing the determined data,
  c. comparing the acquired data with the existing data set, the normative data and/or, if necessary, disease-specific limit values,
  d. analyzing the curve values,
 h) outputting the evaluation result.

The terms used are defined in more detail below.

Measuring body: the measuring body is used to fasten and/or hold the sensor units required for the measurement, the triggering unit or the holding points thereof, and the interfaces for force and data transmission. The force source acts on the measuring body with an acceleration force.

Force source: the force source is able to perform acceleration work on the measuring body. In this case, the time curve of the acceleration work performed is sufficiently known or is detected by a sensor unit. This includes, but is not limited to, the earth's gravitational field in the same manner as a technical device for accelerating objects.

Triggering unit: the triggering unit comprises mechanical and/or electromagnetic components which are suitable for initially holding the measuring body against the resistance of the acting force source or for generating a holding effect counter to the force source. In this case, the components are to be switched at a freely selectable point in time, the holding effect ceasing after the switching process. It is useful in this case to couple the switching process of the triggering unit to a conventional random number generator in order to minimize any subconscious influences by the formation of patterns in the triggering sequences or the influence of a human examiner as far as possible.

Sensor unit: a sensor unit in this case comprises at least one sensor part, a supplier and a transmission part.

The sensor part is a technical component which is designed for the qualitative or quantitative detection of at least one physical or chemical property, preferably as a measured variable. In this case, the physical properties include, for example, the amount of heat, temperature, pressure, sound field variables, brightness or acceleration, and chemical properties include, for example, pH, ionic strength or electrochemical potential. The component is often designed to detect the material properties of the surroundings thereof.

These variables are detected by means of physical or chemical effects and converted into an electrical signal.

The supplier provides the energy required to operate the sensor unit. This also includes the energy required to convert the measured variable into electrical signals and for transmission thereof. This is often provided by an energy source or an energy store, for example a battery, a rechargeable battery or a capacitor.

The transmission part is the part of a sensor unit that is able to communicate the electrical signals formed in the sensor part. This takes place via interfaces which are suitable for signal transmission. These interfaces are not limited to physical interfaces.

Data processing unit: a data processing unit in this case comprises at least one data processing system which is designed to receive the data determined by the sensor unit and to process said data using algorithms. The data processing unit also includes transmitting and receiving devices for this purpose.

The measured data are compared with the values in a normative database. Previous measured values are available in this normative database in the form of raw data and/or refined data. These normative data can contain, for example, previous course curves, disease-specific limit values or digitized literature values of previous methods without being restricted thereto.

In embodiments of the invention, the measuring body is a tube or a rod having a preferably round cross section. In the external dimensions thereof, said tube or rod preferably has a length in the range from 10 cm to 120 cm and/or a diameter in the range from 4 mm to 55 mm and/or a mass in the range from 50 g to 1500 g, smaller masses of up to 10 g also being conceivable as a result of the use of film sensors. The conceivable maximum mass is in this case ultimately limited by the physiognomy of the test subject and whether said subject is able to catch the solid falling measuring body without injury, for example 3000 g. The force source for accelerating the measuring body is in this case the earth's gravitational field, and the tube or rod is arranged vertically in the earth's gravitational field.

The tube or rod is preferably made of an electrical insulator such as wood or plastic, for example polyethylene, or a light metal, for example aluminum, or a composite material such as glass fiber reinforced aluminum or glass fiber reinforced plastics material.

This is advantageous because the transmitting and/or receiving units of the telemetric data transmission can thus be brought into the interior of the tube or rod without the transmitting and/or receiving performance of the corresponding apparatus being excessively impaired.

In embodiments of the invention, the measuring body is made of a solid material. The required cavities are introduced into the solid material, preferably wood or a plastics material, for example polyethylene, or a light metal, for example aluminum, using common abrasive machining processes, for example milling and/or drilling. This is advantageous in order to be able to achieve the highest possible degree of individuality in the design for a wide variety of end users using current methods. For example, a measuring body having a large total mass is used in the field of weight training, since, as a result of the increased mass, a greater inertia leads to better measurement. In addition, the test subjects have a higher physical strength, which must be taken into account. For example, lighter measuring bodies can also be manufactured in this way, which can easily be caught by frail persons.

In embodiments of the invention, the measuring body is produced in a common injection molding process. This is advantageous because it allows large, uniform numbers of items to be produced quickly and economically.

Materials which are suitable for use in 3D printing processes, for example PLA or ABS, are particularly preferred. This is advantageous because an individualized production of the measuring system can thus be achieved. As a result, structures which cannot be implemented by means of an abrasive process are made possible. In this way, the center of gravity of the measuring system can be optimized.

A broad end user base is advantageously achieved by the various manufacturing processes and embodiments of the measuring body.

In embodiments, the tube or the rod can be sealed in such a way that it can be used in moist surroundings without the electrical components being damaged. This is advantageous if the test subject is measured with sweaty hands due to previous physical training.

Another advantage in this case is that the inductive supply of electrical energy is significantly simplified by a plastics casing compared to a metal casing. Furthermore, the effect on the total mass of the measuring system is not negligible.

In embodiments of the invention, the measuring body is formed from plastics segments which are arranged so as to be movable relative to one another and are connected to one another by suitable holding devices. This is advantageous since in this way a small space requirement can be achieved in the case of storage. Furthermore, a flexible outer casing minimizes the risk of injury that can result from incorrect use.

In embodiments of the invention, the inductive coupling of the electrical energy into the measuring body is arranged in the holder, in particular in the triggering unit.

For example, two electromagnets, one inside the measuring body and one outside the measuring body, can hold the measuring body in the rest position thereof. If the current direction is reversed in one of the electromagnets, a force effect occurs between the electromagnets. The measuring body is accelerated by the electromagnet located therein. These electromagnets are thus used to supply energy, as a triggering unit and as a force source.

In embodiments of the invention, the at least second sensor is selected from
  distance sensors, which are preferably optical distance sensors,
  acceleration sensors, which, for example, log the acceleration behavior perpendicular to the primary acceleration axis,
  force sensors, suitable for measuring grip force. The force sensors are preferably implemented by means of piezoresistive pressure sensors, piezoelectric pressure sensors or capacitive pressure sensors.

This is advantageous because, in this way, further data can be acquired and evaluated in correlation with the actual reaction time of the test subjects.

For example, by means of correlated measurement of the acceleration curve and grip force, conclusions can be drawn about neuromuscular properties, neurological tendencies and/or muscle-related tendencies in a movement system-related context.

In embodiments of the invention, the acceleration sensor unit is mounted in the interior of the rod or tube. The sensor unit for measuring the grip force is implemented by a surface sensor along the surface of the rod. This is advantageous since, in this way, the design complexity of the entire measuring system and the economic costs are kept low.

In embodiments of the invention, the sensor units are mounted on the surface of the tube or rod and mechanically connected thereto. In this case, a cascade of sensor units is used to record both the grip force and a two-dimensional image of the force distribution over the surface. This is advantageous because the measured values can be corrected in this way. For example, the gripping reaction may already have taken place, but the full grip force can only be used with a time delay. Furthermore, the forces exerted by the individual fingers can be measured.

In embodiments of the invention, at least one sensor unit and at least one data processing unit are telemetrically connected to one another. This makes contactless remote transmission of the data detected by sensors possible. This telemetric transmission is advantageous because it allows the algorithms for decentralized data evaluation to run on high-performance data processing systems, for example using conventional IT cloud solutions.

In embodiments of the invention, a local evaluation is conceivable. In this case, the data is sent by means of a standard transmission, e.g. WLAN, to a data processing system located within range and is evaluated and interpreted on site by the personnel present.

In embodiments of the invention, the measuring system is used to carry out measurements of reaction time curves in the field of physical training. This is advantageous because competitive athletes in different sports, including martial arts, and people in the aerospace sector rely on precise knowledge of their reaction time curve to optimize their physical performance in the training process in terms of optimal control of load intensities, training volumes and the selection of training equipment and training content.

People in muscle-degenerating surroundings, such as during a long-term stay in space, require monitoring and optimization of their hand-eye reaction ability in order to be able to avert danger under certain circumstances. The measuring system is also used in this field of physical training, the force source for accelerating the measuring body in this case being a force source independent of the earth's gravitational field.

In embodiments of the invention, the measuring system is used in particular in the medical field of application, curatively in rehabilitation and preventively in fitness sports, in order to determine the performance before the training process, to control it during the training process and to quantify it at the end of the treatment duration or the training process. The latter advantageously makes it possible to assess the change in performance state on the basis of the defined target range in which the performance state should ultimately be.

In embodiments of the invention, the measuring system is used to monitor the improvement in hand-eye coordination and gripping function brought about by recreational sports.

The creation of a broad and anonymous database is advantageous when using the measuring system in broad fields of application of physical training. This creates a potentially huge control group and, if necessary, also creates the possibility of comparability, due to the use of network-based data processing systems (e.g. a cloud solution).

In embodiments of the invention, the measuring system is used in the medical field. It is in particular used when measuring reaction time curves and gripping function on test subjects with neurodegenerative diseases, even at an early stage.

The measuring system is in particular used in the indication and/or identification of neurodegenerative diseases from the group of synucleinopathies, for example Parkinson's disease, multiple system atrophies and Lewy body dementia, or in the indication of neurodegenerative diseases from the group of tauopathies, for example Alzheimer's disease.

The advantage of using the measuring system in medical fields of application for indicating and/or identifying neurodegenerative diseases is the creation of a broad and anonymous database, along with the creation and expansion of at least one normative database. In this way, a potentially huge group is created for the relevant illness and, if necessary, also provides the possibility of comparability, due to the use of network-based data processing systems, e.g. a cloud solution.

A non-invasive early indication and/or identification of neurodegenerative diseases in the context of screening tests is advantageously made possible by a well-founded data situation in the normative database.

In embodiments of the invention, the measuring body is a rod having a length of 50 cm and the force source is a return spring which produces an average certification of the measuring body of 10 m/s$^2$. On a suspension means, the return spring is tensioned and the rod is locked in a holder.

The sensor recording is started. A triggering unit separates the connection between the rod and the holder and releases the spring. The rod is accelerated and is caught by the test subject after it has passed through the acceleration distance. A steep increase in acceleration is thus initially measured for the curve of the acceleration measurement. This is followed by a short phase at which the acceleration is ideally zero and the measuring body continues to move in a straight line. A negative acceleration acts on the measuring body as a result of the test subject catching the measuring body.

In embodiments of the invention, the measuring body is a rod which has a rectangular cross section having the dimensions 4 mm×30 mm and a length of 120 mm. The sensor units are in this case planar and arranged on the surface of the measuring body. The force source is the earth's gravitational field and the rod is arranged vertically therein. The rod is secured against falling on a suspension means. The sensor recording is started. A triggering unit releases the connection between the rod and the holder and the rod is in free fall. The rod is accelerated and is caught by the test subject after it has passed through the acceleration distance.

In embodiments of the invention, the triggering unit is an electromagnetic triggering unit and/or a mechanical triggering unit. The advantage of a purely electromagnetic triggering unit is the simplicity of the design and construction thereof. For example, by means of electromagnets which are known per se, analogously to relay technology, the state can be switched from holding to releasing by supplying electrical energy.

A mechanical triggering unit is understood to mean passive systems, such as detents, clamps and/or pegs. An actively mechanical triggering unit is understood to mean pressure-operated systems, for example hydraulics or pneumatics.

The advantage of a purely passive mechanical triggering unit is the independence thereof from an external energy source.

The combination—the mechanical process of a permanent magnet—in this case counts as electromagnetic and/or mechanical.

In embodiments of the invention, the measuring body—the tube or the rod—is connected to a guide system which preferably reduces the degrees of freedom of movement to a translational degree of freedom. This is advantageous because random measurement errors are thus largely prevented. The guide system can also be used to implement a route limitation. This is advantageous because it minimizes the risk of injury if the rod or tube is not caught.

In embodiments of the invention, method steps a) to c) and/or method steps d) to f) and/or method steps g) b. to g) d. are carried out in any order in each case.

In order to implement the invention, it is also expedient to combine the above-described embodiments and features of the claims.

The invention will be explained in greater detail below with reference to some embodiments and accompanying drawings. The embodiments are intended to describe the invention without limiting it.

FIG. 1 is a perspective sketch of an embodiment. The stand having the holding device, the measuring system designed as a rod, and the guide cables which secure the measuring system against tipping over in an uncontrolled manner can be seen.

The middle diagram shows the acceleration time curve along the y-axis. The y-axis in this case follows the horizon line in a parallel or anti-parallel manner.

The diagram at the bottom of the page shows the acceleration along the z-axis. The z-axis, which is perpendicular to the x-axis and the y-axis, points along the radius of the earth.

In particular, in the diagram of the z-axis, a negative curve of the acceleration can be seen at the time 0.95 s. This is the moment at which the triggering unit randomly releases the rod. This is followed by a phase of constant acceleration, which lasts from approx. 1 s to 1.15 s. Here, the rod is in free fall. Subsequently, a steep positive deflection of the acceleration can be seen at the time 1.25 s. Here, the test subject catches the rod and holds the rod for the subsequent period of time.

From the data of the x-axis and y-axis, a trembling movement of the rod can be measured immediately after it has been caught.

FIG. 5, in addition to the measurement of the acceleration curve, shows the measurement of the distance and the grip force. The time base in this case corresponds to the same as in FIG. 4. In the diagram at the top of the page, the optically measured curve of the distance from the top of the rod, the top cap, to the holding device is plotted over time. In the middle diagram, the computed value of the distance is plotted, which results from the mechanical laws of acceleration. In this case, the constant increase in distance after the rod has been caught at the time 1.25 s is not the rod and the holding device physically approaching one another, but an artifact of the data analysis.

In the diagram at the bottom of the page, the measured grip force is plotted over time. The spontaneous and strong release of the sensor ensures a brief over-response at the time 1.25 s. After the rod has been securely caught and the information has been processed by the brain, a decrease in the grip force—the state of relaxation—occurs.

FIG. 6 schematically shows a flow diagram of the method and the measuring operation. This begins with the entry of personal data, such as age, gender, physical condition or previous illnesses. The test is started and completed and the combination of personal data and measurement data is sent to the data processing unit (cloud solution). There, the data is anonymized and compared with existing data sets in the normative database. The finished evaluated result is sent to a terminal. The user can decide whether the result of the analysis, which is available as a log, should be printed out. The resulting data set is entered into the normative database for further use after the procedure has been completed.

Figure 1:
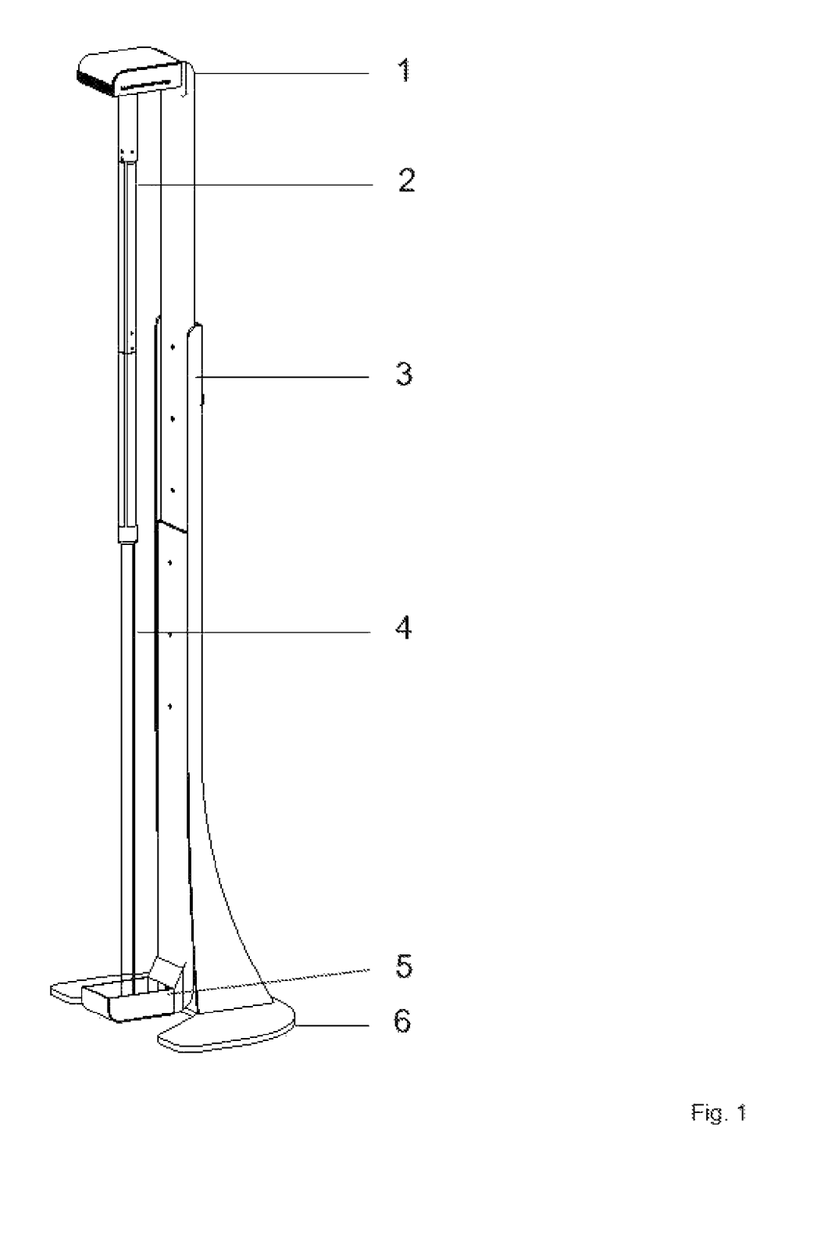
Figure 2:
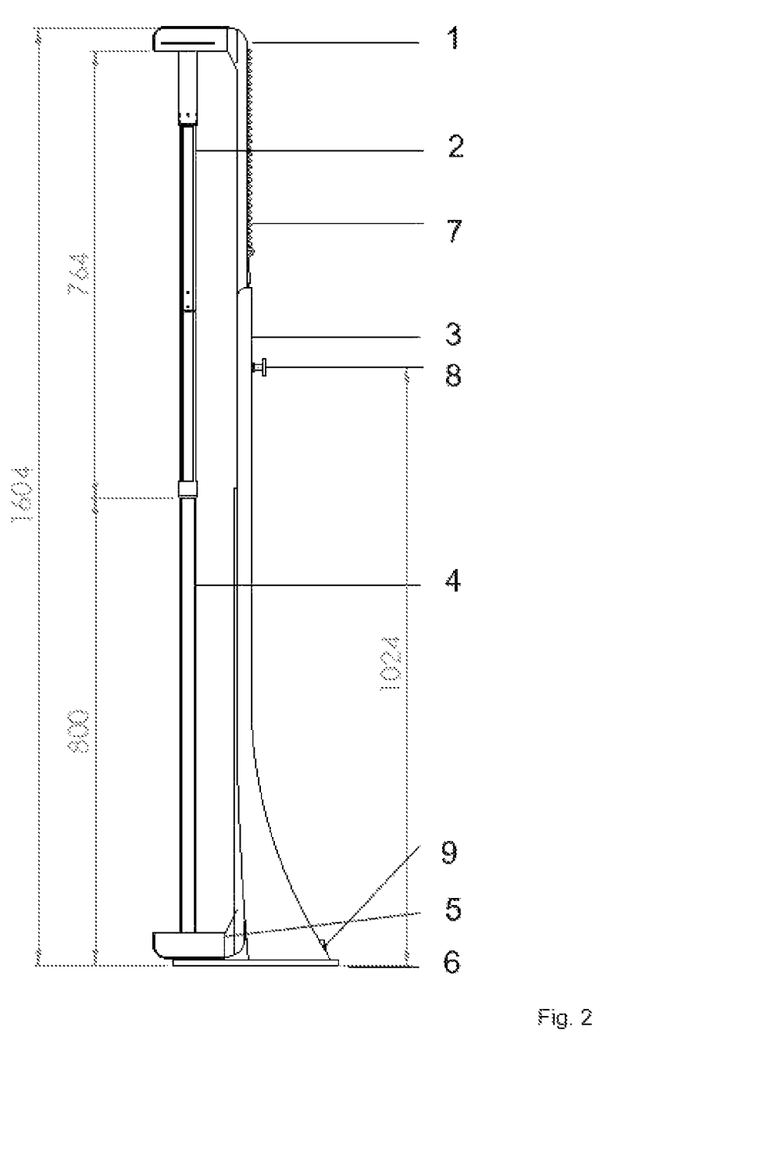
FIG. 2 is a sketch with possible dimensions of an embodiment, in which the measuring system rests in a height-adjustable stand. The minimum height of the height-adjustable stand is given here—the stand is in the retracted state.
Figure 3:
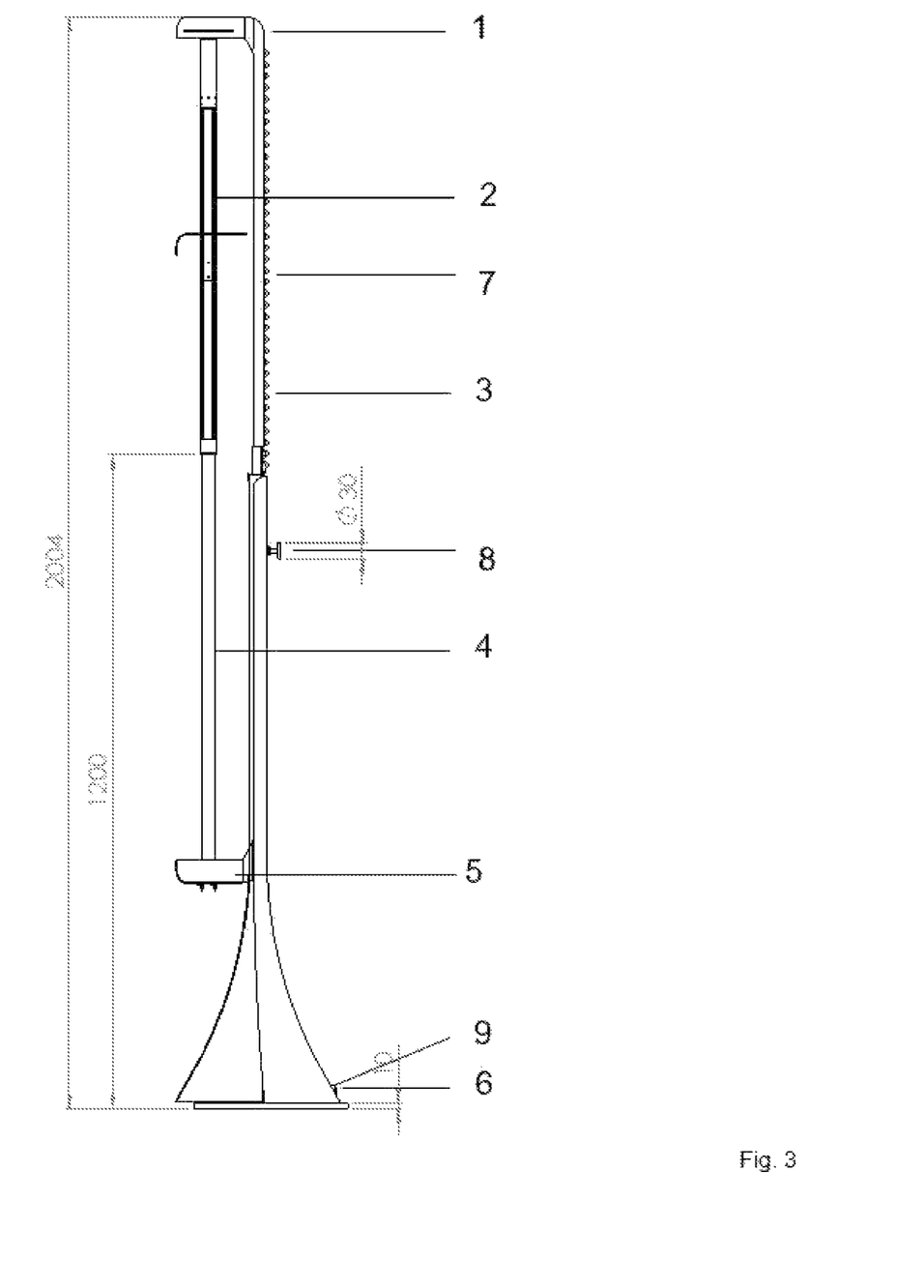
FIG. 3 is a sketch with possible dimensions of an embodiment, in which the measuring system rests in a height-adjustable stand. The maximum height of the height-adjustable stand is given here—the stand is in the extended state.
Figure 4:
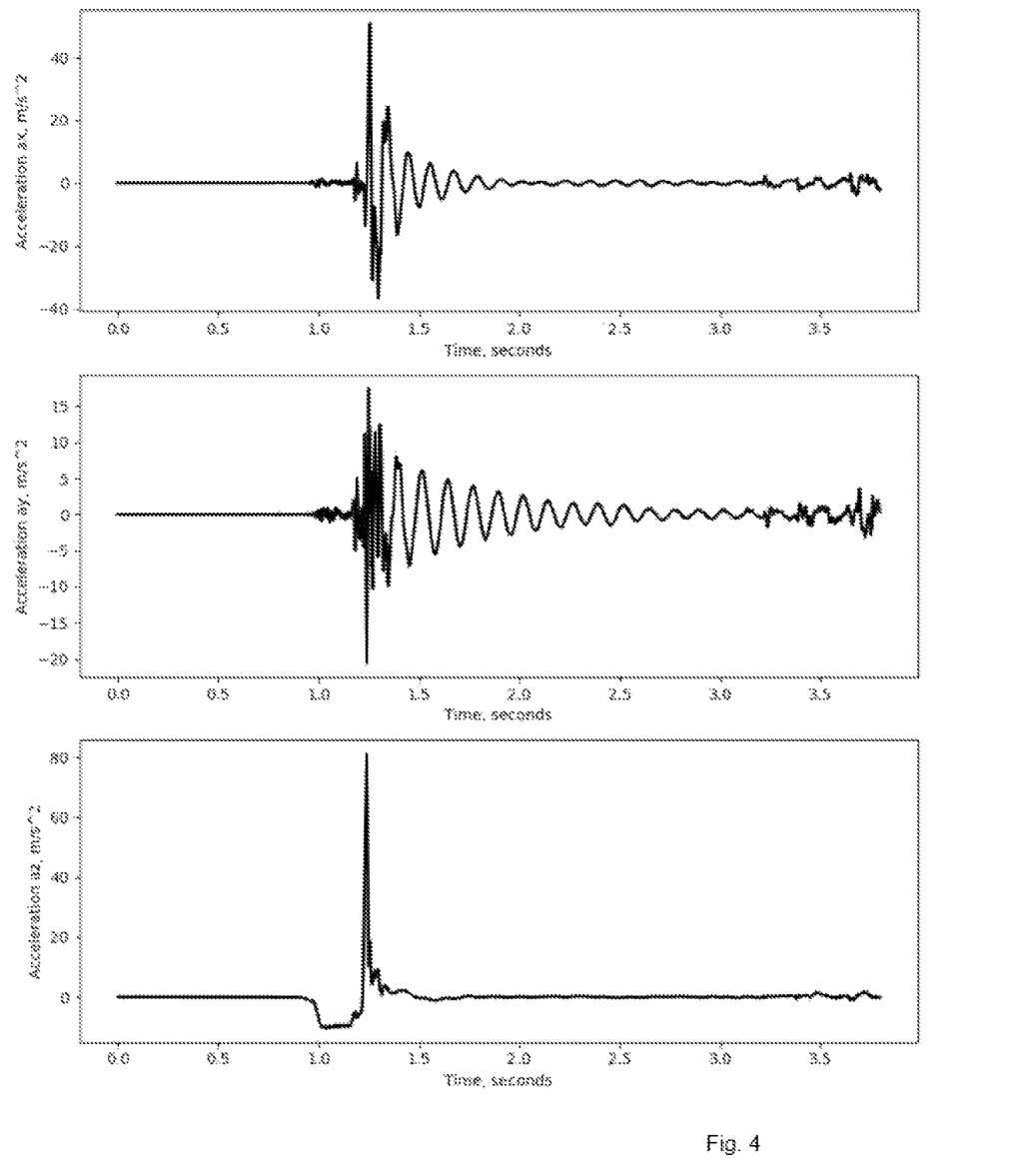
FIG. 4 shows the measurement of the acceleration curves of three orthogonal acceleration sensors over a common time axis. The diagram at the top of the page shows the acceleration along the x-axis. The x-axis in this case assumes the test subject's direction of view, which extends rigidly straight ahead.
Figure 5:
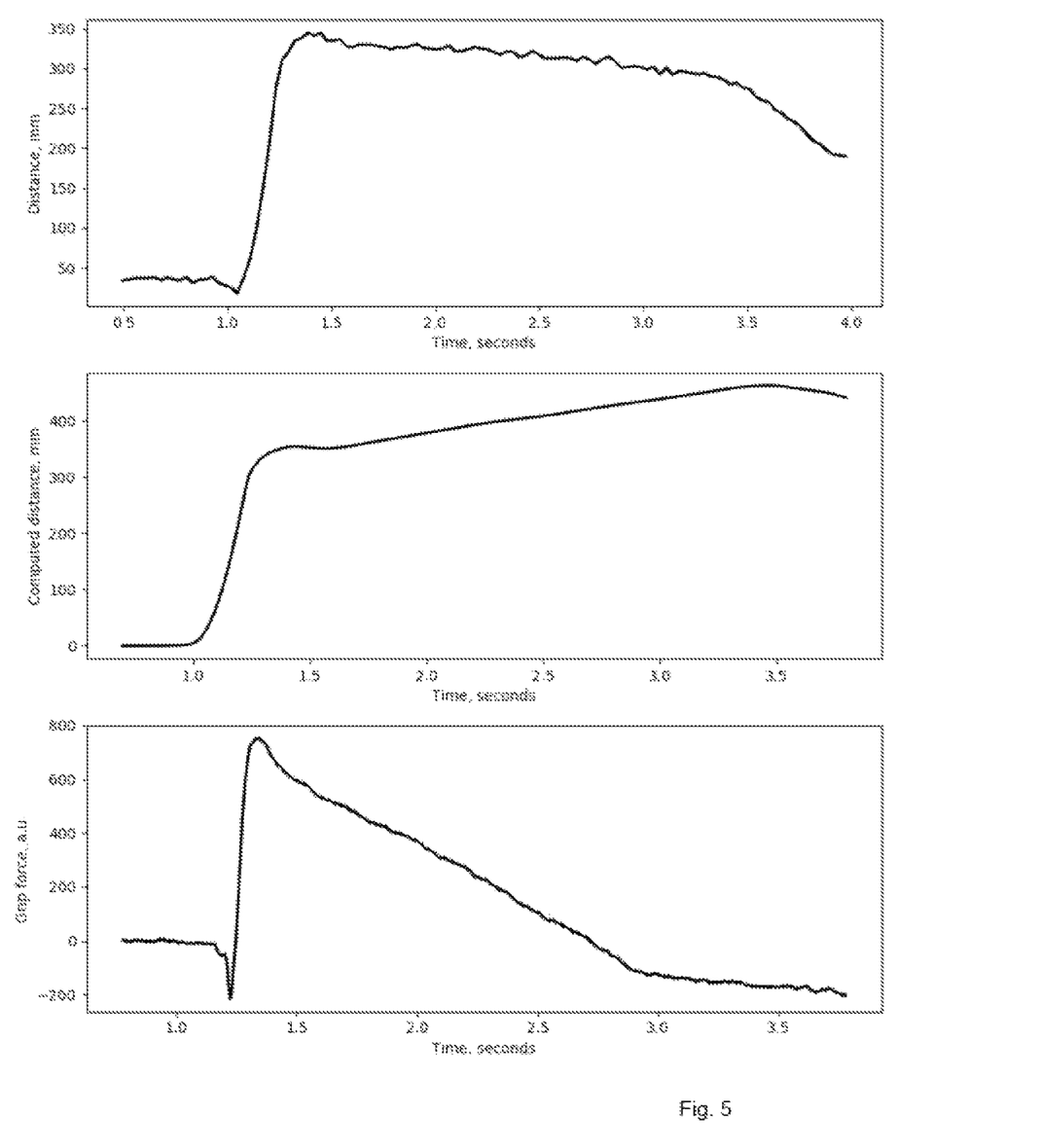
Figure 6:
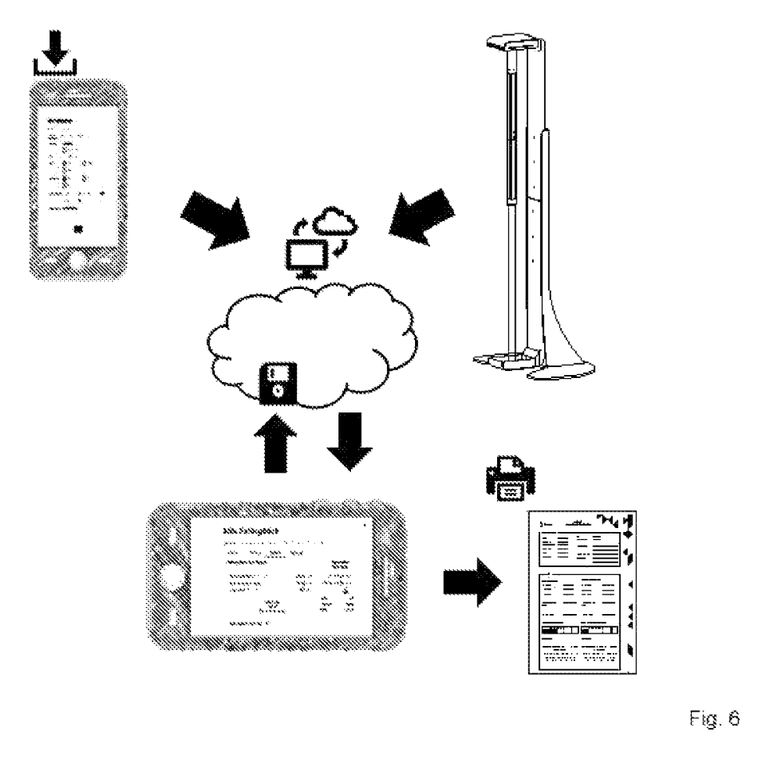

In one embodiment, the measuring system for measuring hand-eye reaction ability comprises the components: rod, height-adjustable stand, charging platform and software.

The rod is divided into the components "top cap" and "body".

The body of the drop rod, the "body", has a round cross section. The rod is made of nylon by means of 3D printing, as nylon is transparent to radio waves and does not interfere with the communication units, and has the following external dimensions:

diameter: 30 mm length rod: 767.1 mm total mass of the drop rod: 405 g

Two force sensors are mounted on and mechanically connected to the outer surface of the rod. These force sensors are designed as long strips having a length of 610 mm. This results in the length of the force-sensitive surface:

length of the measuring range of the force sensor: 610 mm

The body houses a mother board for the control tasks in the interior of the rod, a power supply, a WiFi communication unit, and the interface for sensors and the processor CPU with firmware.

The power supply of the rod, in order to enable data acquisition, storage and transmission independently of the external energy source of the charging platform, is designed in the form of a Li-ion battery.

The upper end cap of the rod, the top cap, is made of the same material as the rod. The top cap and has the following external dimensions:

length: 108 mm,
width: 118 mm,
height: 13 mm.

Three spring contacts are installed on the upper surface of the top cap as an interface for the charging function using the charging platform. In addition to the acceleration sensors, an optical distance sensor is also integrated into the top cap.

The acceleration sensors are arranged to measure the three orthogonal spatial directions. The acceleration sensors primarily determine the exact catch time. The distance between the upper edge of the rod and the charging platform is measured by means of the optical distance sensor. There is no need to specify an exact zero line, defined by the lower edge of the hand at the start position.

The optical distance sensor system measures the fall distance between the charging platform and the top cap, and the acceleration sensors record the catch time, among other things. There is also a unit in the top cap for opening the holding device in order to trigger the free fall.

The measuring system is integrated in the height-adjustable stand and thus allows a standardized measurement of patients with a height of 1.50 m to 1.93 m while standing and sitting. The measurement while sitting is intended for people whose body size is outside the specified limits and/or for people for whom measurement while standing is not possible because they are dependent on a wheelchair, for example. The individual test position is continuously adjusted, taking into account the height of the elbow.

In addition, a damping layer made of pur-ester acoustic foam on the base of the measuring instrument cushions the impact of the rod.

The charging platform provides the energy for the sensor units of the drop rod. For this purpose, three metallic copper contact surfaces are attached to the charging platform at the mechanical interface between the rod and the charging platform. If the rod is in mechanical contact with the charging platform, the rod is adjusted mechanically in such a way that the contact surfaces come into contact with the spring contacts of the top cap and electrical energy can be transmitted. In this way, the Li-Ion battery in the rod is charged. In order to orient the rod as intended in relation to the charging platform and to secure the drop rod against tipping over in an uncontrolled manner after falling to the ground, two guide wires are attached to the charging platform that extend through the rod and are attached to the catching device of the rod. In order to be able to provide the electrical energy, the charging platform has an interface for a power adapter for supplying power. A permanent magnet and an electromagnet are built into the charging platform to hold the rod on the charging platform. This electromagnet can be switched or controlled by a WiFi-based communication element. In this way, the holding state can be changed. This is implemented on the software side by a random generator. The random dropping of the rod is triggered within 6 s after receiving an orientation signal.

Length (including charging platform) 795.3 mm

The software also allows data collection and data processing and accesses a normative database which is made available via a cloud.

The software can be operated by any WLAN-capable terminal. The user interface has a plurality of layers. These layers are the input page "Input-Page",
the test interface "Testing",
the output page "Output-Page" and
the report page "Report-Page".

In an exemplary test procedure, the relevant personal reference variables, such as age, gender, training status or previous illnesses, are entered at the "input page" layer.

The start of the test and/or trials are then initiated via the "Testing" layer. Test parameters, for example the sensitivity of the sensor units, can also be set and changed. In addition, in particular when using a controllable force source which is independent of the earth's gravitational field, the acceleration to be used can be set and/or adapted.

The results of the measurements are displayed and output visually on the "output page" layer. The data are in this case presented as absolute values and are interpreted on the basis of the comparison with the normative database and the age-specific and disease-specific limit values.

Finally, a "report page" is generated in the form of a PDF file, which clearly shows all results—including an interpretation and brief description. Every measurement is stored in the cloud. A data protection-compliant comparison of a plurality of measurements of a single person is also provided.

LIST OF REFERENCE SIGNS

1 Top cap and charging platform
2 Rod
3 Height adjustable stand
4 Guide wires
5 Catching device comprising a tensioning mechanism for the guide wires and a damping layer
6 Foot stand
7 Power cord
8 Lever for continuous height adjustment
9 Power adapter

The invention claimed is:

1. A measuring system for measuring hand-eye reaction, comprising:
    a measuring body,
    at least one holding device comprising a base portion configured to engage a ground surface and a stand portion that extends upwardly from the base portion,
    at least one triggering unit coupled to the stand portion configured to selectively engage with the measuring body to maintain the measuring body in an elevated position and selectively disengage with the measuring body to release the measuring body from the elevated position,
    at least one first sensor unit integrated with the measuring body, wherein the at least one first sensor unit is designed to measure acceleration,
    at least one second sensor unit integrated with the measuring body, comprising at least one force sensor configured to measure a force of a grip of a user's hand on the measuring body, at least one interface for data transmission, wherein said interface is designed to transmit computer-readable signals, and at least one data processing unit configured to determine an acceleration curve over a measurement duration of the acceleration of the measuring body via the at least one first sensor unit after the at least one triggering unit selectively disengages the measuring body from the stand portion, determine a force curve over a measurement duration of the force of the grip of the user's hand of the measuring body via the at least one force sensor after the at least one triggering unit selectively disengages the measuring body from the stand portion, and to identify the presence or absence of neurodegenerative diseases based on an analysis of the determined acceleration and force curves and at least one database of acceleration and force curves associated with a plurality of neurodegenerative diseases.

2. The measuring system according to claim 1, wherein the measuring body is a rod and has a length in the range from 10 cm to 120 cm and/or a diameter in the range from 4 mm to 55 mm and/or a mass in the range from 50 g to 1500 g.

3. The measuring system according to claim 1, wherein the triggering unit is a magnetic triggering unit, an electronic triggering unit, an electromagnetic triggering unit or a mechanical triggering unit.

4. The measuring system according to claim 1, wherein the at least one force sensor extends along a length of the outer surface of the measuring body, and is configured to detect a force distribution of the force of the grip of the user's hand along the length of the measuring body.

5. The measuring system according to claim 4, wherein the at least one force sensor is at least one piezoresistive pressure sensor, at least one piezoelectric pressure sensor, or at least one capacitive pressure sensor.

6. The measuring system according to claim 1, wherein the at least one first sensor unit and the data processing unit are telemetrically connected to one another, and the at least one second sensor unit and the data processing unit are telemetrically connected to one another.

7. The measuring system according to claim 1, wherein the triggering unit is a magnetic triggering unit, an electronic triggering unit, an electromagnetic triggering unit or a mechanical triggering unit.

8. The measuring system according to claim 1, wherein the at least one force sensor is at least one piezoresistive pressure sensor, at least one piezoelectric pressure sensor, or at least one capacitive pressure sensor.

9. The measuring system according to claim 1, wherein:
the at least one second sensor further comprises at least one optical distance sensor or an acceleration sensor configured to measure distance of travel of the measuring body when the at least one trigger unit releases the measuring body from the elevated position; or
the at least one force sensor is configured to measure distance of travel of the measuring body when the at least one trigger unit releases the measuring body from the elevated position.

10. The method according to claim 1, wherein the plurality of neurodegenerative diseases comprises synucleinopathy or tauopathy.

11. The method according to claim 1, wherein the plurality of neurodegenerative disease comprises Parkinson's disease, multiple system atrophies, Lewy body dementia and Alzheimer's disease.

12. The measuring system according to claim 1, wherein:
the measuring body is a rod and has a length in the range from 10 cm to 120 cm and/or a diameter in the range from 4 mm to 55 mm and/or a mass in the range from 50 g to 1500 g; and
the triggering unit is a magnetic triggering unit, an electronic triggering unit, an electromagnetic triggering unit or a mechanical triggering unit.

13. The measuring system according to claim 1, wherein the at least one first sensor unit is configured to measure acceleration in a plurality of differing directions.

14. A method for quantifying reaction times, comprising:
providing a measuring system for measuring hand-eye reaction, the measuring system comprising:
a measuring body;
at least one holding device comprising a base portion configured to engage a ground surface and a stand portion that extends upwardly from the base portion;
at least one triggering unit coupled to the stand portion configured to selectively engage with the measuring body to maintain the measuring body in an elevated position and selectively disengage with the measuring body to release the measuring body from the elevated position;
at least one first sensor unit integrated with the measuring body, wherein the at least one first sensor unit is designed to measure acceleration;
at least one second sensor unit integrated with the measuring body, comprising at least one force sensor configured to measure a force of a grip of a user's hand on the measuring body;
at least one interface for data transmission, wherein said interface is designed to transmit computer-readable signals; and
at least one data processing unit configured to correlate acceleration values measured by the at least one first sensor unit and force values measured by the at least one force sensor, and to identify the presence or absence of neurodegenerative diseases based on the correlated values and at least one database of acceleration and force values associated with a plurality of neurodegenerative diseases;
positioning a test subject relative to the measuring system, starting the measurement,
randomly triggering the at least one triggering unit to selectively disengage the measuring body from the stand portion,
detecting an acceleration curve over a measurement duration of the acceleration of the measuring body via the at least one first sensor unit,
detecting a force curve over the measurement duration of the force of the grip of the user's hand of measuring body via the at least one force sensor,
transferring all sensor data associated with the detected acceleration curve and the detected force curve to the data processing unit,
logging the detected data,
storing the detected data,
comparing the detected data with the at least one database of acceleration and force values associated with the plurality of neurodegenerative diseases,
analyzing the detected acceleration curve and the detected force curve,
outputting an evaluation result of whether the presence or absence of neurodegenerative diseases was identified based on the comparing of the detected data with the at least one database of acceleration and force values associated with the plurality of neurodegenerative diseases and the analyzing of the detected acceleration curve and the detected force curve.

15. The method according to claim 14, wherein the at least one database of acceleration and force values comprises at least one database of acceleration and force curves associated with the plurality of neurodegenerative diseases, and wherein the at least one data processing unit is configured to correlate the determined acceleration and force curves and identify the presence or absence of neurodegenerative diseases based on an analysis of the determined acceleration and force curves and the database of acceleration and force curves associated with the plurality of neurodegenerative diseases.

16. The measuring system according to claim 15, wherein the system is configured to determine a plurality of acceleration curves over a measurement duration of the acceleration of the measuring body in the plurality of differing directions via the at least one first sensor unit after the at least one triggering unit selectively disengages the measuring body from the stand portion, wherein the measurement duration comprises a first period of time with negative acceleration values associated with the user's hand catching the measuring body and a second period of time that is after the first period of time, and wherein the at least one data processing unit is configured to identify the presence or absence of neurodegenerative diseases based on an analysis of the plurality of acceleration curves and the database of acceleration values associated with the plurality of neurodegenerative diseases.

17. A measuring system for measuring hand-eye reaction, comprising:
a measuring body,
at least one holding device comprising a base portion configured to engage a ground surface and a stand portion that extends upwardly from the base portion,
at least one triggering unit coupled to the stand portion configured to selectively engage with the measuring body to maintain the measuring body in an elevated position and selectively disengage with the measuring body to release the measuring body from the elevated position,
at least one first sensor unit integrated with the measuring body, wherein the at least one first sensor unit is designed to measure acceleration,
at least one second sensor unit integrated with the measuring body, comprising at least one force sensor configured to measure a force of a grip of a user's hand on the measuring body,
at least one interface for data transmission, wherein said interface is designed to transmit computer-readable signals, and
at least one data processing unit configured to determine an acceleration curve over a measurement duration of the acceleration of the measuring body via the at least one first sensor unit after the at least one triggering unit selectively disengages the measuring body from the stand portion, wherein the measurement duration comprises a first period of time with negative acceleration values associated with the user's hand catching the measuring body and a second period of time that is after the first period of time, and wherein the at least one data processing unit is configured to identify the presence or absence of neurodegenerative diseases based on an analysis of the acceleration curve and the at least one database of acceleration and force values associated with the plurality of neurodegenerative diseases.

18. A measuring system for measuring hand-eye reaction, comprising:
a measuring body,
at least one holding device comprising a base portion configured to engage a ground surface and a stand portion that extends upwardly from the base portion,
at least one triggering unit coupled to the stand portion configured to selectively engage with the measuring body to maintain the measuring body in an elevated position and selectively disengage with the measuring body to release the measuring body from the elevated position,
at least one first sensor unit integrated with the measuring body, wherein the at least one first sensor unit is designed to measure acceleration,
at least one second sensor unit integrated with the measuring body, comprising at least one force sensor configured to measure a force of a grip of a user's hand on the measuring body,
at least one interface for data transmission, wherein said interface is designed to transmit computer-readable signals, and
at least one data processing unit configured to determine a force curve over a measurement duration of the force of the grip of the user's hand of the measuring body via the at least one force sensor after the at least one triggering unit selectively disengages the measuring body from the stand portion, wherein the measurement duration comprises a first period of time with force values associated with the user's hand catching the measuring body and a second period of time that is after the first period of time, and wherein the at least one data processing unit is configured to identify the presence or absence of neurodegenerative diseases based on an analysis of the force curve and the at least one database of acceleration and force values associated with the plurality of neurodegenerative diseases.

19. A measuring system for measuring hand-eye reaction, comprising:
a measuring body,
at least one holding device comprising a base portion configured to engage a ground surface and a stand portion that extends upwardly from the base portion,
at least one triggering unit coupled to the stand portion configured to selectively engage with the measuring body to maintain the measuring body in an elevated position and selectively disengage with the measuring body to release the measuring body from the elevated position,
at least one first sensor unit integrated with the measuring body, wherein the at least one first sensor unit is designed to measure acceleration,
at least one second sensor unit integrated with the measuring body, comprising at least one force sensor configured to measure a force of a grip of a user's hand on the measuring body,
at least one interface for data transmission, wherein said interface is designed to transmit computer-readable signals, and
at least one data processing unit configured to determine an acceleration curve over a measurement duration of the acceleration of the measuring body via the at least one first sensor unit after the at least one triggering unit selectively disengages the measuring body from the stand portion, and determine a force curve over a measurement duration of the force of the grip of the user's hand of the measuring body via the at least one force sensor after the at least one triggering unit selectively disengages the measuring body from the stand portion, and wherein the measurement duration comprises a first period of time with negative acceleration values and force values associated with the user's hand catching the measuring body and a second period of time that is after the first period of time.

* * * * *